United States Patent
Koukes et al.

(10) Patent No.: US 8,509,994 B2
(45) Date of Patent: Aug. 13, 2013

(54) SYSTEM AND METHOD FOR DETERMINING A STEERING LOCK ANGLE OF A VEHICLE

(75) Inventors: Vladimir Koukes, Darmstadt (DE); Ralf Herbst, Nastätten (DE); Mathias Niepelt, Friedberg (DE); Robert Schmidt, Kelkheim (DE); Jochen Führer, Darmstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 254 days.

(21) Appl. No.: 13/123,916

(22) PCT Filed: Nov. 6, 2009

(86) PCT No.: PCT/US2009/063567
§ 371 (c)(1),
(2), (4) Date: Apr. 13, 2011

(87) PCT Pub. No.: WO2010/043702
PCT Pub. Date: Apr. 22, 2010

(65) Prior Publication Data
US 2011/0301815 A1 Dec. 8, 2011

(30) Foreign Application Priority Data
Oct. 17, 2008 (DE) .......................... 10 2008 052 196
Dec. 18, 2008 (DE) .......................... 10 2008 063 567

(51) Int. Cl.
*B62D 15/02* (2006.01)

(52) U.S. Cl.
USPC ............................................. 701/42; 180/421

(58) Field of Classification Search
USPC ............................... 701/41–43; 180/421, 422
See application file for complete search history.

(56) References Cited

U.S. PATENT DOCUMENTS

| | | | |
|---|---|---|---|
| 5,001,637 A | 3/1991 | Shiraishi et al. | |
| 7,548,042 B2 * | 6/2009 | Fassnacht | 323/265 |
| 8,126,612 B2 * | 2/2012 | Ahmed et al. | 701/42 |
| 2004/0024565 A1 | 2/2004 | Yu et al. | |
| 2007/0088477 A1 | 4/2007 | Brewer et al. | |

FOREIGN PATENT DOCUMENTS

| | | |
|---|---|---|
| DE | 697 14 806 T2 | 12/2002 |
| DE | 10255469 A1 | 6/2004 |
| WO | WO 2007/113332 A2 | 10/2007 |

* cited by examiner

*Primary Examiner* — Richard M. Camby
(74) *Attorney, Agent, or Firm* — Brinks Hofer Gilson & Lione

(57) ABSTRACT

In a method for determining a steering angle for a vehicle, a steering angle is determined using a single-track model of the vehicle, wherein the steering angle is corrected only if the difference between the derivative of a measured steering lock angle and the derivative of a calculated steering lock angle is below a threshold value. Otherwise the measurement is repeated.

11 Claims, 2 Drawing Sheets

SYSTEM AND METHOD FOR DETERMINING A STEERING LOCK ANGLE OF A VEHICLE

CROSS REFERENCE TO RELATED APPLICATIONS

This application claims priority to German Patent Applications No. 102008052196.5, filed Oct. 17, 2008, and 102008063567.7, filed Dec. 18, 2008, as well as International Patent Application No. PCT/EP2009/063567, filed Oct. 16, 2009.

FIELD OF THE INVENTION

The invention relates to the determination of a steering lock angle or steering angle of vehicles. In particular, the invention relates to a system for determining a steering lock angle of a vehicle, to a method for determining a steering lock angle of a vehicle, to a program element and to a computer-readable medium.

TECHNOLOGICAL BACKGROUND

Cost-effective sensors for measuring the steering wheel angle provide relative values of the angle with respect to the position of the steering wheel at the start of ignition of the vehicle. The measured angle of the steering wheel at the start of ignition is, however, generally shifted with respect to the center position of the steering wheel (referred to as zero point shift or offset). After the start of the ignition, the sensor therefore firstly indicates a zero value irrespective of the position of the steering wheel even though the angle is not equal to zero in every case. However, the steering angle must be measured precisely (and in absolute terms) because it is used in the electronic stability program (EPS) and is highly significant for the safety of the vehicle.

DE 697 14 806 T2 discloses a method for determining the position of a steering wheel in which the center position of the steering wheel is estimated with a first predefined algorithm or a second predefined algorithm, depending on whether a calculated steering wheel lock angle is within or outside a specific interval. Depending on the algorithm used, relatively fast or relatively slow leveling off to a center position value occurs.

SUMMARY OF THE INVENTION

An object of the invention is to make available fast and precise determination of the zero point shift of the measured steering angle and therefore rapid and precise determination of the actual steering lock angle.

The present invention achieves this object with a system for determining a steering lock angle, a method for determining a steering lock angle, a program element and a computer-readable medium are specified in accordance with the features of the independent claims. Developments of the invention can be found in the dependent claims.

The described exemplary embodiments likewise concern the system for determining a steering lock angle, the method, the program element and the computer-readable medium. In other words, the features which are specified below with respect to the system for determining a steering lock angle can also be implemented in the method, the program element or the computer-readable medium, and vice-versa.

According to one exemplary embodiment of the invention, a system for determining a steering lock angle of a vehicle is specified which has a sensor arrangement and a control unit. The sensor arrangement serves to measure a yaw rate and a steering angle of the vehicle. On the basis of the measured steering angle, the steering lock angle which is measured is obtained (therefore at least indirectly) given knowledge of the steering transmission ratio. The control unit is designed to calculate the steering lock angle on the basis of the measured yaw rate and the measured steering angle. Furthermore, the control unit is designed to calculate a time derivative of the measured steering lock angle and a time derivative of the calculated steering lock angle as well as to determine whether a first deviation between the derivative of the measured steering lock angle and the derivative of the calculated steering lock angle is below a first predetermined threshold.

Furthermore, the control unit serves to carry out a correction of the measured steering lock angle on the basis of the calculated steering lock angle, in particular if the first deviation is below the first threshold. If the first deviation is not below the first threshold but rather is above it, the measurement of the yaw rate and of the steering angle, as well as the calculations subsequent thereto, are repeated.

However, even if the first deviation is not below the first threshold, the steering lock angle can nevertheless be corrected. The corrected value and/or the calculated zero point shift is/are passed on to corresponding vehicle systems (for example to the ESP) together with the information relating to the quality of the correction (i.e., for example, the first deviation and, if appropriate, further values such as trust interval and standard deviation of the zero point shift). These systems can then use the calculated value in a first step and know simultaneously how "good" this value is. A newly calculated value is then supplied to the systems later (with the aid of further measured values). In other words, starting from a very early time a useable value for the zero point shift, which can then be always improved again, is already made available to the systems. After and, if appropriate, during the transfer, further measured values are sensed, with the result that new, more precise calculations can take place. The new values (zero point shift, first deviation and, if appropriate, further values such as trust interval and standard deviation of the zero point shift) are transferred again to the vehicle systems, with the result that the method approaches the actual value for the zero point shift.

It is to be noted that when the terms steering lock angle and steering angle are used below, these terms can be used synonymously since the steering lock angle can be calculated directly from the steering angle, and vice-versa.

Ultimately, it is therefore not significant whether measured data relating to the steering angle or measured data relating to the steering lock angle are made available.

For example, the steering lock angle is determined using the so-called single-track model. The steering lock angle is, however, calculated only when the measured values are "good enough", i.e. if the model can be applied sufficiently well (is valid). In order to decide this, it is checked whether the time derivatives between the measured steering lock angle and the calculated steering lock angle are close enough to one another. If the differences are too large, i.e. if they exceed a specific threshold, further measurements have to be carried out.

According to a further exemplary embodiment of the invention, the control unit is also designed to determine whether a second deviation between a first measured steering lock angle (or first steering angle) and a chronologically subsequent, second measured steering lock angle (or a chronologically subsequent, second measured steering angle) is below a second predetermined threshold. Furthermore, the correction of the measured steering lock angle is carried out on the basis of the calculated steering lock angle only if the second deviation is below the second threshold. Otherwise, the measurement is repeated. Likewise, the subsequent calculations are repeated until this second condition is also met.

It is therefore determined whether the quality of the measurements of the steering angle or of the steering lock angle is sufficiently high. This does not necessarily have to be carried out by comparing the differences between adjacent measured values with a threshold value. In order to estimate whether the quality of the measurement is sufficient, it is also possible to verify whether the measured value is not outside a specific range, for example $|\delta|<S$. Furthermore, a mean value can be formed over a specific, relatively short time interval. The measured value must not differ much from this mean value. It is also additionally possible to check whether the sensor is functioning without faults.

According to a further exemplary embodiment of the invention, the control unit is also designed to determine an averaged zero point shift of a sensor of the sensor arrangement for measuring the steering lock angle on the basis of averaging of a plurality of calculated zero point shifts over time. Furthermore, the control unit is designed to correct the measured steering lock angle on the basis of the averaged zero point shift.

Alternatively, according to a further exemplary embodiment of the invention, a filtered zero point shift of the sensor of the sensor arrangement can occur on the basis of filtering of the measured yaw rate and of the measured steering lock angle, after which the measured steering lock angle is corrected on the basis of the filtered zero point shift.

This can be advantageous when there is insufficient storage space available for the storage of the measured values which are necessary for the formation of the mean value.

According to a further exemplary embodiment of the invention, the measured steering lock angle is corrected only if an estimated standard deviation of the calculated or filtered zero point shifts is within a predetermined third threshold.

Furthermore, in addition to the standard deviation it is also possible to calculate what is referred to as the trust interval. The standard deviation and trust interval are already calculated the first time shortly after the start of the method, i.e. generally after the switching on of the ignition (therefore for example after the processing of two or three measured values). The calculated zero point shift, the standard deviation and the trust interval are then transferred to the corresponding vehicle systems (for example ESP, vehicle control systems). At the same time or afterwards, further measured values are detected, with the result that new, more precise calculations can take place. The new values (zero point shift, standard deviation and trust interval) are transferred again to the vehicle systems, with the result that the method approaches the actual value for the zero point shift.

According to a further exemplary embodiment of the invention, the measurements and the subsequent calculations are repeated if the estimated standard deviation of the calculated or filtered zero point shifts is above the third threshold.

According to a further exemplary embodiment of the invention, the filtering is repeated with an increased filter constant if the estimated standard deviation is above the third threshold.

According to a further exemplary embodiment of the invention, the control unit is an ESP control unit.

According to a further exemplary embodiment of the invention, a vehicle is specified having a system for determining a steering lock angle as described above.

According to a further exemplary embodiment of the invention, a method is specified for determining a steering lock angle of a vehicle, in which method a yaw rate and a steering angle of the vehicle are measured, wherein a (measured) steering lock angle is obtained from the measured steering angle. Furthermore, the steering lock angle is calculated on the basis of the measured yaw rate and of the measured steering angle. The time derivative of the measured steering lock angle and the time derivative of the calculated steering lock angle are also calculated. Then, it is determined whether a first deviation between the derivative of the measured steering lock angle and the derivative of the calculated steering lock angle is below a first predetermined threshold. If the first deviation is below the first threshold, the measured steering lock angle is corrected on the basis of the calculated steering lock angle. If the first deviation is above the first threshold, the measurements and the subsequent calculations are repeated.

According to a further exemplary embodiment of the invention, a program element is specified which, when it is executed on a processor, induces the processor to carry out the method steps specified above.

According to a further exemplary embodiment of the invention, a computer-readable medium is specified on which a program element is stored, which element, when it is executed on a processor, induces the processor to carry out the method steps specified above.

In this context, the program element can, for example, be part of a software package which is stored on a processor of an ESP control unit. In this context, the processor can likewise be a subject matter of the invention. Furthermore, this exemplary embodiment of the invention comprises a program element which already uses the invention from the beginning, and also a program element which causes an existing program to use the invention by means of an update.

Exemplary embodiments of the invention will be described below with reference to the figures.

DETAILED DESCRIPTION OF EXEMPLARY EMBODIMENTS

Figure 1:
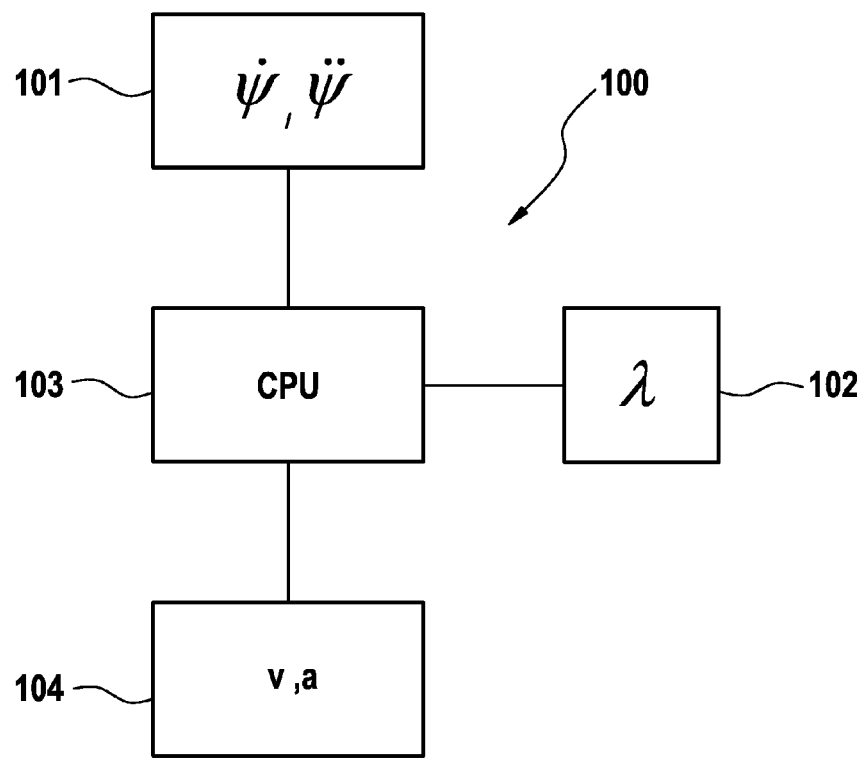
FIG. 1 shows a system for determining a steering lock angle according to an exemplary embodiment of the invention.

The illustrations in the figures are schematic and not to scale.

In the following description of the figures, the same reference numerals are used for the same or similar elements.

FIG. 1 shows a system 100 for determining a steering lock angle, which system 100 has, in addition to a control unit 103, which is embodied, for example, in the form of a CPU, a plurality of sensors 101, 102, 104.

The sensor 101 serves to measure the yaw rate of the vehicle. Furthermore, the sensor 101 measures the time derivative of the yaw rate. A plurality of sensors can also be provided for this purpose. It is also possible for the time derivative of the yaw rate not to be measured but rather to be calculated, for example by means of the control unit 103.

The sensor 102 measures the (relative) steering angle of the vehicle, and the sensor 104 measures the vehicle velocity and/or the acceleration of said vehicle. The acceleration can alternatively also be calculated from the time profile of the measured vehicle velocity.

The control unit 103 serves to calculate the steering angle or the steering lock angle and to correct the zero point shift. A theoretical, model-based calculation of the steering angle is important, in particular, when the vehicle travels constantly in one direction (to the left or to the right) for some time in the starting phase after the start of the ignition, i.e. the steering is locked.

The zero point shift of the steering angle and the correction of the measurement results are based on what is referred to as the single-track model of the vehicle (cf. also Zomotor, Adam, Fahrwerktechnik: Fahrverhalten [Chassis Technology: Driving Behavior]; Vogel 1987).

In the single-track model, the relationship between the steering lock angle and the yaw rate is used. A steering angle is connected to the steering lock angle $\delta_0$ (for example the front wheel steering lock angle):

$$\delta_0 = \lambda/K \quad (1)$$

where $\lambda$ represents the steering angle; and
where K represents the steering transmission ratio.

According to the single-track model of the vehicle, the relationship between the steering lock angle and the yaw rate can be described as follows:

$$\delta_{theoret} = \frac{\dot{\psi} * l}{V} + EG * \dot{\psi} * V \quad (2)$$

where $\delta_{theoret}$ represents the theoretically determined steering lock angle;
where l represents the wheel base;
where V represents the velocity; and
where $\dot{\psi}$ represents the yaw rate.

EG—inherent steering gradient (this is a vehicle parameter within the scope of the single-track model).

The ratio (2) must generally only be used under certain limited conditions, for example [cf. M. Mitschke; Dynamik der Kraftfahrzeuge [Motor Vehicle Dynamics]; volume C, Springer-Verlag 1990]:

1. Velocity V=const. (no acceleration in the longitudinal direction of the vehicle).
2. Two degrees of freedom: yaw movement and swimming movement.
3. No rolling movement, no difference in wheel load between the wheel on the inside of the bend and the wheel on the outside of the bend on one axle.
4. No reciprocating movement or pitching movement, constant wheel loads at the front axle and rear axle.
5. The wheel contact points, at which the lateral forces of the wheels which are necessary to maintain the course act, are combined on an axle-by-axle basis in the center of the vehicle.
6. Small steering angle and slip angle, linearized lateral force characteristic curves at the tires.
7. The tire castors and restoring torques owing to the slip angles are neglected.
8. Small circumferential forces at the tires. (The condition V=const. requires longitudinal forces which can, however, be neglected when the steering lock angles are small).

When calculating the steering lock angle and correcting the measurement results of the steering lock angle sensor it is necessary to ensure that the ratio (2) or the single-track model is valid. Otherwise the correction is incorrect.

For monitoring the state of the vehicle and the driving conditions, a time derivative $$\frac{d\delta}{dt} = \dot{\delta}$$

of the measured steering lock angle is calculated. From (2) the following results for the theoretical time derivative:

$$\left(\frac{d\delta}{dt}\right)_{theoret} = \dot{\delta}_{theoret} = \frac{\ddot{\psi} * l}{V} + \frac{a * \dot{\psi}}{V^2} + EG * (\ddot{\psi} * V + a * \dot{\psi}) \quad (3)$$

where $\ddot{\psi}$ is the yaw acceleration and
a is the vehicle acceleration.

A time derivative of the measured steering lock angle is not influenced by the zero point shift. If the ratio (3) is valid, there must only be small differences between the measured and the calculated values:

$$\left| \frac{\lambda}{K} - \frac{\ddot{\psi} * l}{V} - \frac{a * \dot{\psi}}{V^2} - EG * (\ddot{\psi} * V + a * \dot{\psi}) \right| < \varepsilon \quad (4)$$

where $\varepsilon$ is a small threshold value.

The calculation according to (4) is made on the basis of the available measured or calculated values $\delta$, $\dot{\delta}$, $\dot{\psi}$, $\ddot{\psi}$, V, a in an ESC control unit. Furthermore it is monitored whether the measured values do not have any excessively large jumps, for example:

$$|\lambda_n - \lambda_{n-1}| < \varepsilon 1 \quad (5)$$

where $\lambda_{n-1}$ represents the measured steering angle in the measurement n−1;
where $\delta_n$ represents the measured steering angle in the measurement n;
and where $\varepsilon 1$ is a small predetermined threshold value.

If (4) and (5) are satisfied, the rolling angle is calculated in accordance with (2). In this case, the theoretical values $\delta_{theoret}$ are used for the correction of the measured values of the steering lock angle.

The measured steering angle is written as follows:

$$\lambda = \Delta + \left(\frac{\dot{\psi} * l}{V} + EG * \dot{\psi} * V\right) * K \quad (6)$$

where $\Delta$ is the zero point shift of the sensor.

The results of N measurements are summed and used for the determination of the zero point shift of the sensor:

$$A = \sum_{i=1}^{N} \lambda_i; \quad (7)$$

$$B = \sum_{i=1}^{N} \frac{\dot{\psi}_i * l}{V_i};$$

$$D = \sum_{i=1}^{N} \dot{\psi}_i * V_i;$$

-continued $$\overline{\Delta}_N = \frac{1}{N} * (A - B*K - EG*C*K)$$

where $\overline{\Delta}_N$ and N is a value of the zero point shift which is averaged over time.

For this value, an estimate of the standard deviation σ and an estimate for the trust interval $p*\sigma_N$ are calculated:

$$\sigma_N = \sqrt{\frac{\sum_{i=1}^{N}(\Delta_i - \overline{\Delta}_N)^2}{N-1}} \quad (8)$$

$$\overline{\Delta}_N - p*\sigma_N \leq \Delta \leq \overline{\Delta}_N + p*\sigma_N$$

where =p(N) is an empirical parameter and is dependent on N.

The trust interval $p*\sigma_N$ is used in ESP for the adaptive changing of the parameters of the check system. It is checked whether $\sigma_N$ is small enough:

$$\sigma_N < S_0 \quad (9)$$

where $S_0$ is a parameter which is defined as a function of the requirements of the ESC.

If $\sigma_N$ is too large, the measurements are carried on and the calculations are repeated as in the equations (7) to (8) for the next measurements.

Similar steps are repeated until the value of 6 is small enough (the ratio of the equation (9) is therefore valid).

The corrected steering angle is calculated as follows:

$$\lambda_0 = \lambda - \overline{\Delta}_N \quad (10)$$

In order to be able to use the method described above, it is necessary to retain N measured values V, $\dot{\psi}$ and λ in a memory. If this is not possible, a different simplified method can be used. Instead of the formation of mean values, a low-pass filter with a filter constant F is used:

$$A = Filt_F(\delta_i); \quad (11)$$

$$B = Filt_F\left(\frac{\dot{\psi}_i}{V_i} * 1\right);$$

$$D = Filt_F(\dot{\psi} * V_i);$$

$$\tilde{\Delta}_F = (A - B*K - EG*C*K)$$

where $\tilde{\Delta}_N$ is a filtered value of the zero point shift.

The estimates for the standard deviation and the trust interval are calculated as in (8):

$$\sigma_F = \sqrt{\frac{\sum_{i=1}^{F}(\Delta_i - \tilde{\Delta}_F)^2}{F-1}} \quad (12)$$

$$\tilde{\Delta}_F - p*\sigma_F \leq \Delta \leq \tilde{\Delta}_F + p*\sigma_F$$

If the estimated standard deviation is too large ($\sigma_F > S_0$), the filter constant is increased incrementally until this value is small enough ($\sigma_F < S_0$).

The corrected steering angle is calculated as follows:

$$\lambda_0 = \lambda - \tilde{\Delta}_F \quad (13)$$

Figure 2:
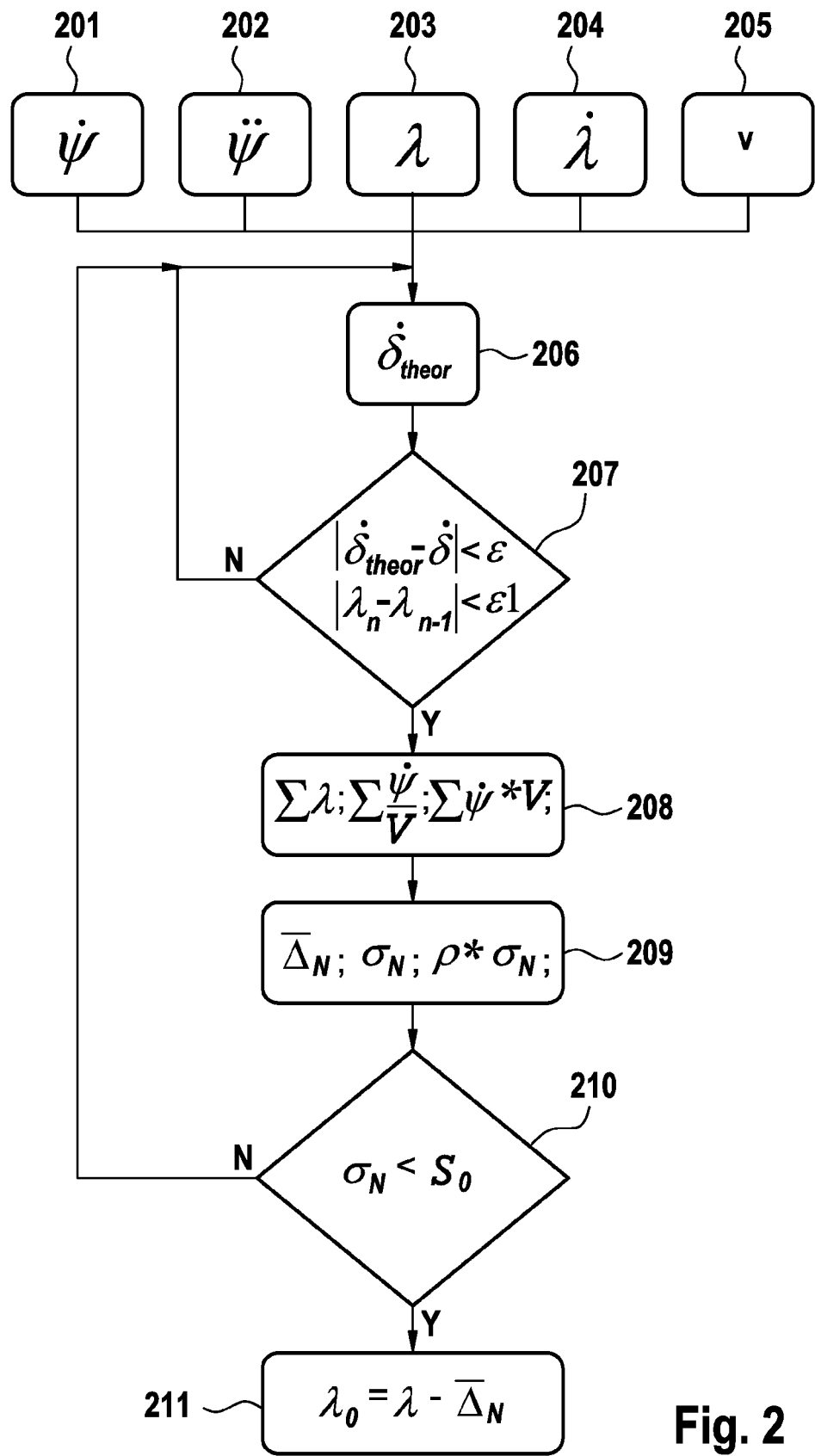
FIG. 2 shows a flowchart of a method according to an exemplary embodiment of the invention.

FIG. 2 shows a flowchart of a method according to an exemplary embodiment of the invention. The yaw rate 201, the time derivative of the yaw rate 202, the steering angle 203, the time change of the steering angle 204 and the vehicle velocity 205 or the vehicle acceleration are included in the calculation of the theoretical time derivative of the steering lock angle 206.

In this context, for example, the yaw rate 201, the steering angle 203 and the vehicle velocity 205 are measured. The time derivative of the yaw rate 202 and the acceleration of the vehicle as well as the time derivative of the steering angle 204 can be calculated or alternatively also measured.

In step 207, the differences between the theoretical time derivative of the steering lock angle and the measured time derivative of the steering lock angle are then compared with a first threshold value ε and the difference between adjacent measured steering angles is compared with a second threshold value $\epsilon_1$.

If these differences are each below the corresponding threshold value, further calculations are carried out in step 208. If at least one of these differences is not below the corresponding threshold value, further measured values are added and the method is carried on with step 206.

However, if the conditions (4) and (5) are met, the results from N measurements are summed in step 208 (see also equation (7)).

In step 209, the calculation of the zero point shift which is averaged over time, of the standard deviation and of the trust interval is then carried out.

In step 210 it is then determined whether the standard deviation is small enough, i.e. is below a specific threshold value. If the standard deviation is too large, further measured values are added and the calculation 206 is carried out again followed by the steps 207 to 210.

If the standard deviation is below the predetermined threshold value, the corrected steering angle is calculated by the equation (10) in step 211.

As an alternative to the formation of mean values, a low-pass filter with a filter constant can also be used (see equations (11), (12) and (13)).

In addition it is to be noted that "comprising" and "having" do not preclude any other elements or steps and "a" does not rule out a plurality. In addition, it is to be noted that features or steps which have been described with reference to one of the above exemplary embodiments can also be used in combination with other features or steps of other exemplary embodiments described above. Reference symbols in the claims are not to be considered to have restrictive force.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A system for determining a steering lock angle of a vehicle, the system comprising:
    a sensor arrangement for measuring a yaw rate and a steering angle of the vehicle, and
    a control unit, configured for:

translating the measured steering angle into a measured steering lock angle;

calculating a calculated steering lock angle on the basis of the measured yaw rate and the measured steering angle;

calculating a time derivative of the measured steering lock angle and a time derivative of the calculated steering lock angle;

determining whether a first deviation between the derivative of the measured steering lock angle and the derivative of the calculated steering lock angle is below a first predetermined threshold;

correcting the measured steering lock angle on the basis of the calculated steering lock angle; and repeating the measurement and the subsequent calculations if the first deviation is above the first threshold.

2. The system for determining a steering lock angle as claimed in claim 1, the control unit also being configured for:

determining whether a second deviation between a first measured steering lock angle and a chronologically subsequent, second measured steering lock angle is below a second predetermined threshold; and repeating the measurement and the subsequent calculations if the second deviation is above the second threshold.

3. The system for determining a steering lock angle as claimed in claim 1, the control unit also being configured for:

calculating successive zero point shifts of a sensor of the sensor arrangement for measuring the steering lock angle;

determining an averaged zero point shift on the basis of averaging a plurality of the calculated zero point shifts over time; and correcting the measured steering lock angle on the basis of the averaged zero point shift.

4. The system for determining a steering lock angle as claimed in claim 1, the control unit also being configured for:

determining a filtered zero point shift of a sensor of the sensor arrangement for measuring the steering lock angle on the basis of filtering of the measured yaw rate and of the measured steering lock angle; and correcting the measured steering lock angle on the basis of the filtered zero point shift.

5. The system for determining a steering lock angle as claimed in claim 4, the control unit also being configured for repeating the measurements and the subsequent calculations if an estimated standard deviation of the calculated or filtered zero point shifts is above a predetermined third threshold.

6. The system for determining a steering lock angle as claimed in claim 5, the control unit also being configured for repeating the filtering with an increased filter constant if the estimated standard deviation is above the third threshold.

7. The system for determining a steering lock angle as claimed in claim 5, the control unit also being configured for:

calculating a trust interval with respect to the zero point shifts; and supplying information on the standard deviation, the trust interval and the corresponding zero point shift to an ESP control unit, even if the trust interval and the standard deviation are not below the predetermined thresholds.

8. The system for determining a steering lock angle as claimed in claim 1, the control unit being an ESP control unit.

9. A vehicle having a system for determining a steering lock angle as claimed in claim 1.

10. A method for determining a steering lock angle of a vehicle, the method comprising the steps of:

measuring a yaw rate and a steering angle of the vehicle;

translating the measured steering angle into a measured steering lock angle;

calculating a calculated steering lock angle on the basis of the measured yaw rate and of the measured steering angle;

calculating a time derivative of the measured steering lock angle and of a time derivative of the calculated steering lock angle;

determining whether a first deviation between the derivative of the measured steering lock angle and the derivative of the calculated steering lock angle is below a first predetermined threshold;

correcting the measured steering lock angle on the basis of the calculated steering lock angle; and repeating the measurement and the subsequent calculations if the first deviation is above the first threshold.

11. A non-transitory computer-readable medium on which a program element is stored, which element, when it is executed on a processor, induces the processor to carry out the following steps:

translating a measured steering angle into a measured steering lock angle;

calculating a calculated steering lock angle on the basis of a measured yaw rate and the measured steering angle;

calculating a time derivative of the measured steering lock angle and a time derivative of the calculated steering lock angle;

determining whether a first deviation between the derivative of the measured steering lock angle and the derivative of the calculated steering lock angle is below a first predetermined threshold;

correcting the measured steering lock angle on the basis of the calculated steering lock angle if the first deviation is below the first threshold; and repeating the measurement and the subsequent calculations if the first deviation is above the first threshold.

* * * * *